United States Patent
Abraham et al.

(10) Patent No.: US 12,381,868 B2
(45) Date of Patent: Aug. 5, 2025

(54) PORTAL CONTROL OF WEB SITE CREDENTIALS USING ASYMMETRIC PUBLIC/PRIVATE KEY ENCRYPTION WITHOUT USER SELECTION OR USER PASSWORD MANAGEMENT

(71) Applicant: Bank of America Corporation, Charlotte, NC (US)

(72) Inventors: Joshua Abraham, Sharon, MA (US); Steven Sinks, Scottsdale, AZ (US)

(73) Assignee: Bank of America Corporation, Charlotte, NC (US)

( * ) Notice: Subject to any disclaimer, the term of this patent is extended or adjusted under 35 U.S.C. 154(b) by 226 days.

(21) Appl. No.: 18/095,676

(22) Filed: Jan. 11, 2023

(65) Prior Publication Data
US 2024/0236079 A1  Jul. 11, 2024

(51) Int. Cl.
*H04L 9/40* (2022.01)
(52) U.S. Cl.
CPC ........ *H04L 63/083* (2013.01); *H04L 63/0442* (2013.01); *H04L 63/0861* (2013.01)
(58) Field of Classification Search
CPC ............. H04L 63/0442; H04L 63/0815; H04L 63/083; H04L 63/0861; H04L 63/0884; H04W 12/068; G06F 21/41
See application file for complete search history.

(56) References Cited

U.S. PATENT DOCUMENTS

| 6,412,073 B1 | 6/2002 | Rangan |
| 8,296,834 B2 | 10/2012 | Ritari et al. |
| 8,413,222 B1 * | 4/2013 | Cooley ................ G06F 21/335 726/8 |

(Continued)

FOREIGN PATENT DOCUMENTS

EP  3544256 B1  8/2020

OTHER PUBLICATIONS

Newman, Lily. "A New Google Chrome Extension Will Detect Your Unsafe Passwords". <https://www.wired.com/story/password-checkup-chrome-extension/>. Feb. 2019. (Year: 2019).*

(Continued)

*Primary Examiner* — Michael Simitoski
(74) *Attorney, Agent, or Firm* — Banner & Witcoff, Ltd.

(57) ABSTRACT

An information-security method for securely accessing a web site through non-password user authentication to an intermediary portal is disclosed. A hardware/biometric login authenticates a user to a portal, which provides 1-click user access to web sites. The portal generates a strong password for each web site. Private keys with the passwords embedded therein are generated by the portal and stored along with public keys for the web sites. Communications between the portal and web sites are asymmetrically encrypted using the keys. Passwords for the web sites are updated or autorotated by the portal on-demand, at periodic intervals, and/or in response to data breaches or threat vectors to provide enhanced security. Updated login credentials are communicated to the web sites when the passwords are changed by the portal. Passwords are managed transparently to the user such that users need not be aware or keep track of their passwords.

8 Claims, 7 Drawing Sheets

(56) References Cited

U.S. PATENT DOCUMENTS

| | | | | |
|---|---|---|---|---|
| 8,763,096 | B1* | 6/2014 | Hernacki | H04L 9/32 |
| | | | | 715/764 |
| 9,077,747 | B1* | 7/2015 | Chen | H04L 63/1433 |
| 9,392,075 | B1* | 7/2016 | Radovnikovic | H04N 21/835 |
| 10,068,082 | B1* | 9/2018 | Zheng | G06F 21/45 |
| 10,114,943 | B1* | 10/2018 | Shitrit | H04L 63/0876 |
| 10,146,931 | B1* | 12/2018 | Kronrod | H04L 63/0846 |
| 10,193,880 | B1* | 1/2019 | Jiang | H04L 63/08 |
| 10,200,359 | B1* | 2/2019 | Sokolov | H04L 63/0853 |
| 10,230,564 | B1* | 3/2019 | Hu | H04L 63/0838 |
| 10,331,879 | B1* | 6/2019 | Jiang | H04L 63/083 |
| 10,360,366 | B1* | 7/2019 | Dubey | H04L 41/0663 |
| 10,574,648 | B2* | 2/2020 | Guillory | H04L 63/083 |
| 10,917,400 | B1* | 2/2021 | Goings | H04L 63/0815 |
| 11,044,247 | B2* | 6/2021 | Lee | H04L 63/102 |
| 11,070,506 | B2* | 7/2021 | Ragsdale | H04L 67/55 |
| 11,275,825 | B1* | 3/2022 | Kapinos | H04L 9/0894 |
| 11,288,359 | B1* | 3/2022 | Caldwell | H04L 63/102 |
| 11,836,241 | B1* | 12/2023 | Unnikrishnan | G06F 21/41 |
| 2002/0023059 | A1* | 2/2002 | Bari | H04L 63/08 |
| | | | | 705/76 |
| 2002/0032782 | A1* | 3/2002 | Rangan | G06Q 30/0277 |
| | | | | 726/28 |
| 2002/0078386 | A1* | 6/2002 | Bones | G06F 21/41 |
| | | | | 726/8 |
| 2006/0080545 | A1* | 4/2006 | Bagley | G06F 21/31 |
| | | | | 713/184 |
| 2007/0226783 | A1* | 9/2007 | Mimlitsch | H04L 63/0815 |
| | | | | 726/4 |
| 2008/0031447 | A1* | 2/2008 | Geshwind | H04L 9/0822 |
| | | | | 713/168 |
| 2008/0077983 | A1* | 3/2008 | Meyer | H04L 63/0815 |
| | | | | 715/234 |
| 2008/0282185 | A1* | 11/2008 | Blass | H04L 63/0846 |
| | | | | 715/780 |
| 2009/0083539 | A1* | 3/2009 | Catherman | G06F 21/57 |
| | | | | 713/156 |
| 2009/0172795 | A1* | 7/2009 | Ritari | H04L 63/0815 |
| | | | | 726/8 |
| 2009/0198618 | A1 | 8/2009 | Chan et al. | |
| 2009/0271854 | A1* | 10/2009 | Hazlehurst | G06F 21/41 |
| | | | | 726/7 |
| 2010/0017616 | A1* | 1/2010 | Nichols | H04L 63/06 |
| | | | | 726/6 |
| 2010/0083358 | A1* | 4/2010 | Govindarajan | H04L 63/08 |
| | | | | 726/6 |
| 2010/0095118 | A1* | 4/2010 | Meka | G06F 21/6227 |
| | | | | 713/168 |
| 2010/0325687 | A1* | 12/2010 | Iverson | G06F 21/41 |
| | | | | 717/134 |
| 2011/0083181 | A1* | 4/2011 | Nazarov | H04L 63/14 |
| | | | | 726/23 |
| 2011/0125924 | A1* | 5/2011 | McAleer | H04L 67/1095 |
| | | | | 709/248 |
| 2011/0296509 | A1* | 12/2011 | Todorov | H04L 63/083 |
| | | | | 726/7 |
| 2013/0198823 | A1* | 8/2013 | Hitchcock | G06F 21/41 |
| | | | | 726/6 |
| 2013/0263250 | A1* | 10/2013 | Leckey | H04L 63/0846 |
| | | | | 726/18 |
| 2014/0172548 | A1* | 6/2014 | Garlick | G06Q 30/0246 |
| | | | | 705/14.45 |
| 2014/0173708 | A1* | 6/2014 | Garlick | H04L 63/0853 |
| | | | | 726/7 |
| 2014/0298432 | A1* | 10/2014 | Brown | G06F 21/34 |
| | | | | 726/6 |
| 2014/0325620 | A1* | 10/2014 | Samson | H04L 63/083 |
| | | | | 718/100 |
| 2014/0337937 | A1* | 11/2014 | Truskovsky | G06F 21/554 |
| | | | | 726/5 |
| 2015/0012443 | A1* | 1/2015 | Bhat | G06F 9/451 |
| | | | | 705/50 |
| 2015/0248553 | A1* | 9/2015 | Strand | G06F 21/45 |
| | | | | 726/6 |
| 2015/0286816 | A1* | 10/2015 | Adler | H04L 63/083 |
| | | | | 726/6 |
| 2016/0070894 | A1* | 3/2016 | Boodaei | H04L 9/0825 |
| | | | | 713/155 |
| 2016/0373436 | A1* | 12/2016 | Kapoor | H04L 63/0846 |
| 2017/0011214 | A1* | 1/2017 | Cavanagh | H04L 63/0846 |
| 2017/0244683 | A1* | 8/2017 | Mohamed | H04L 63/083 |
| 2017/0308695 | A1* | 10/2017 | Adams | H04L 63/06 |
| 2018/0004928 | A1* | 1/2018 | Hayashi | H04L 63/0853 |
| 2018/0004935 | A1* | 1/2018 | Siegrist | H04W 12/068 |
| 2018/0159842 | A1* | 6/2018 | Lurey | H04W 12/068 |
| 2018/0218446 | A1* | 8/2018 | Ries | H04L 63/0884 |
| 2019/0050557 | A1* | 2/2019 | Martin | H04L 63/08 |
| 2019/0095609 | A1* | 3/2019 | Aguilar-Macias | H04L 63/083 |
| 2019/0140844 | A1* | 5/2019 | Brown | H04L 63/0428 |
| 2019/0208421 | A1* | 7/2019 | Ziraknejad | H04L 9/0825 |
| 2019/0215375 | A1* | 7/2019 | Ragsdale | H04L 63/0428 |
| 2019/0289013 | A1 | 9/2019 | Makmel et al. | |
| 2019/0333062 | A1 | 10/2019 | Gallagher, III | |
| 2019/0356661 | A1* | 11/2019 | Hecht | H04L 9/0891 |
| 2020/0127992 | A1* | 4/2020 | Pham | H04L 9/3231 |
| 2020/0137041 | A1* | 4/2020 | DeGennaro | G06F 21/31 |
| 2020/0137096 | A1* | 4/2020 | Endler | H04L 63/083 |
| 2020/0187004 | A1* | 6/2020 | Reimer | H04L 63/083 |
| 2020/0380115 | A1* | 12/2020 | Knight | G06F 21/46 |
| 2020/0410086 | A1* | 12/2020 | Harmon | G06F 16/252 |
| 2021/0084029 | A1* | 3/2021 | Kallugudde | G06Q 20/3821 |
| 2021/0152353 | A1* | 5/2021 | Canillas | G06F 21/64 |
| 2021/0349989 | A1* | 11/2021 | Cao | H04L 9/0825 |
| 2021/0367966 | A1 | 11/2021 | Yanay et al. | |
| 2022/0053331 | A1* | 2/2022 | Weksler | H04W 12/068 |
| 2022/0182229 | A1 | 6/2022 | Biham et al. | |
| 2022/0232007 | A1* | 7/2022 | Tayouri | G06F 21/64 |
| 2022/0237282 | A1* | 7/2022 | Tzur-David | H04L 63/126 |
| 2023/0198968 | A1* | 6/2023 | Medvinsky | H04L 63/0435 |
| | | | | 713/155 |
| 2023/0224325 | A1* | 7/2023 | Mautone | G06F 21/31 |
| | | | | 726/22 |
| 2023/0300125 | A1* | 9/2023 | Kido | H04L 63/083 |
| | | | | 726/7 |
| 2024/0007455 | A1* | 1/2024 | Sarkar | G06F 9/451 |
| 2024/0146737 | A1* | 5/2024 | Rothschild | H04L 9/0891 |
| 2024/0177208 | A1* | 5/2024 | Kumar | G06Q 20/12 |

OTHER PUBLICATIONS

Duffy, Jill. "Make All Your Passwords Strong and Unique in 5 Steps". <https://zapier.com/blog/how-to-change-your-passwords/>. Oct. 2018. (Year: 2018).*

LastPass. "Use the Sharing Center". <https://web.archive.org/web/20190222022217/https://support.logmeininc.com/lastpass/help/use-the-sharing-center-Ip020007>. Feb. 2019. (Year: 2019).*

Paul, Ian. "Nifty new LastPass, Dashlane features canchange your passwords for you". <https://www.pcworld.com/article/430756/nifty-new-lastpass-dashlane-features-can-change-your-passwords-for-you.html). Dec. 2014. (Year: 2014).*

University of Regina. "KeePass Password Safe: Password Manager", file dated 2017, referring page dated Jan. 2022. (Year: 2022).*

* cited by examiner

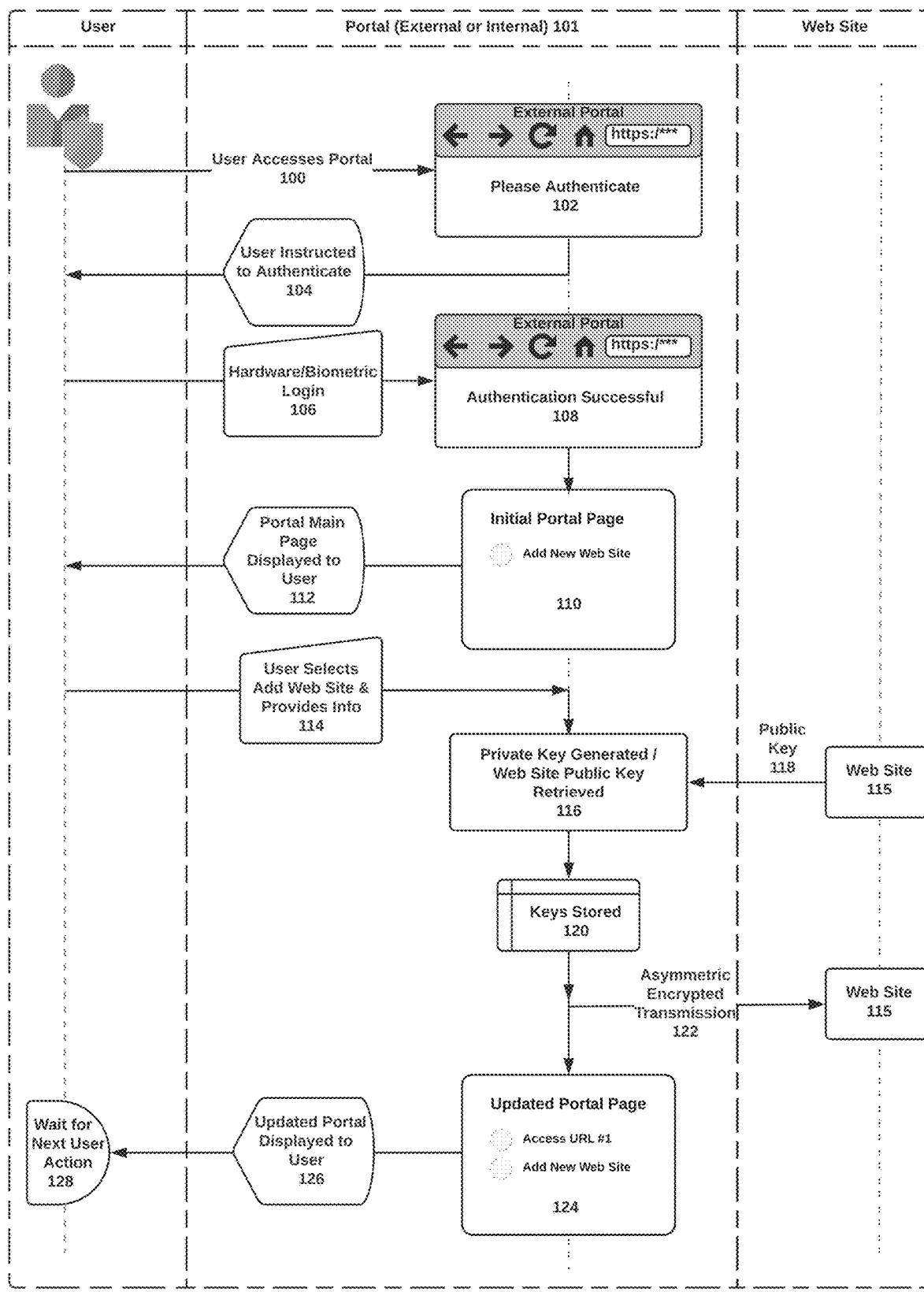
FIG. 1 - Setup / Add New Site

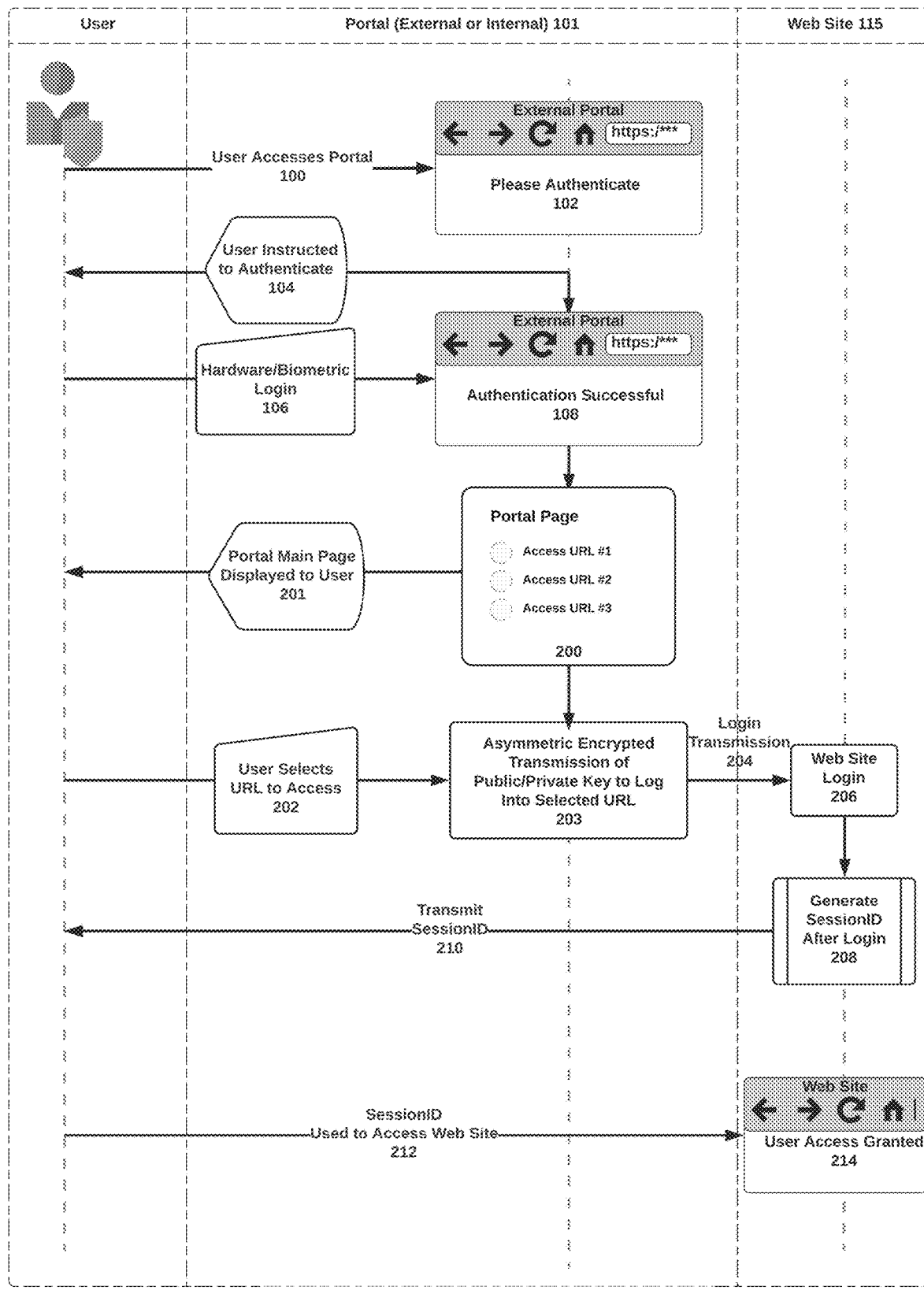
FIG. 2 - Use Portal to Access Web Site

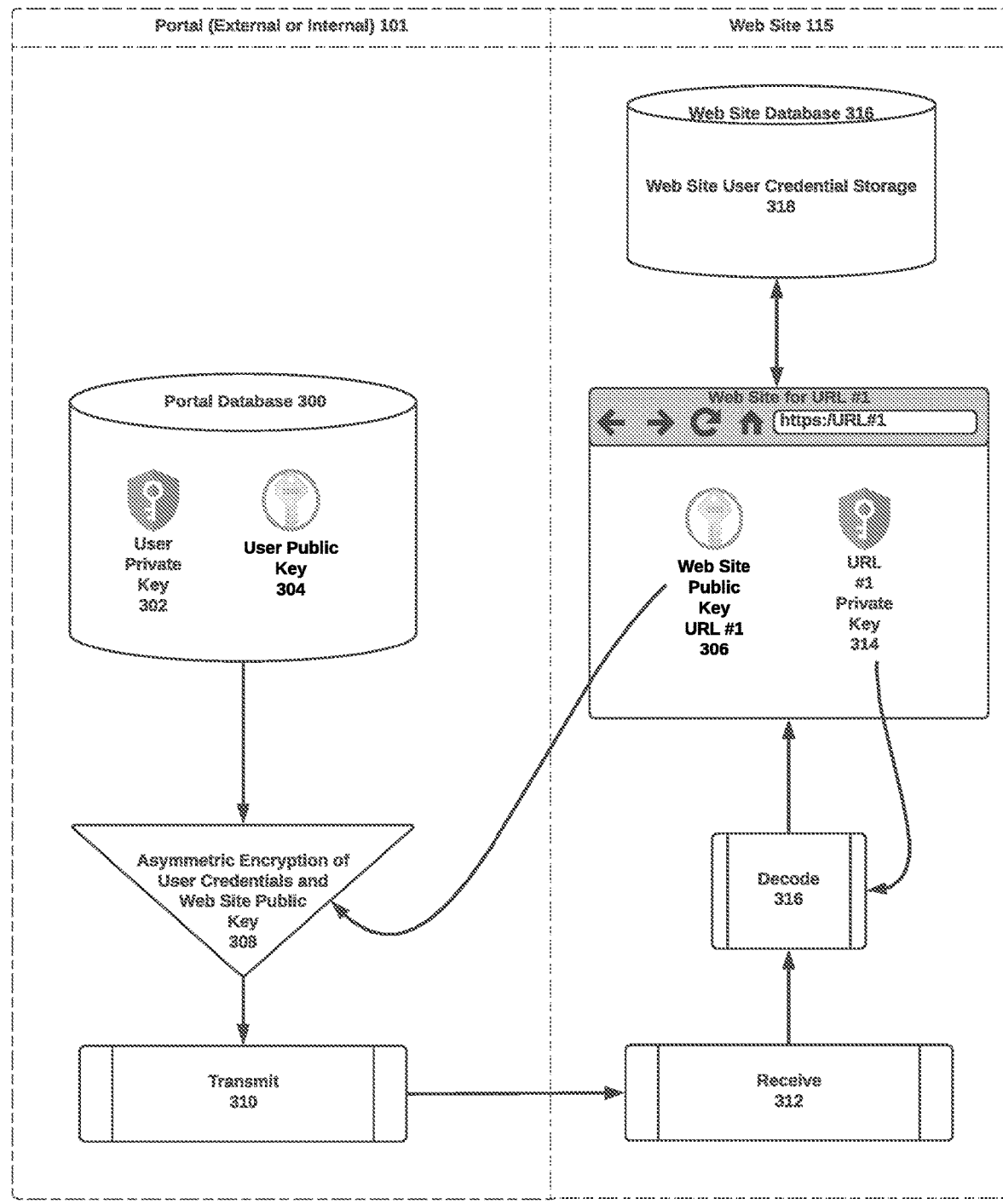
FIG. 3 - Asymmetric Encryption

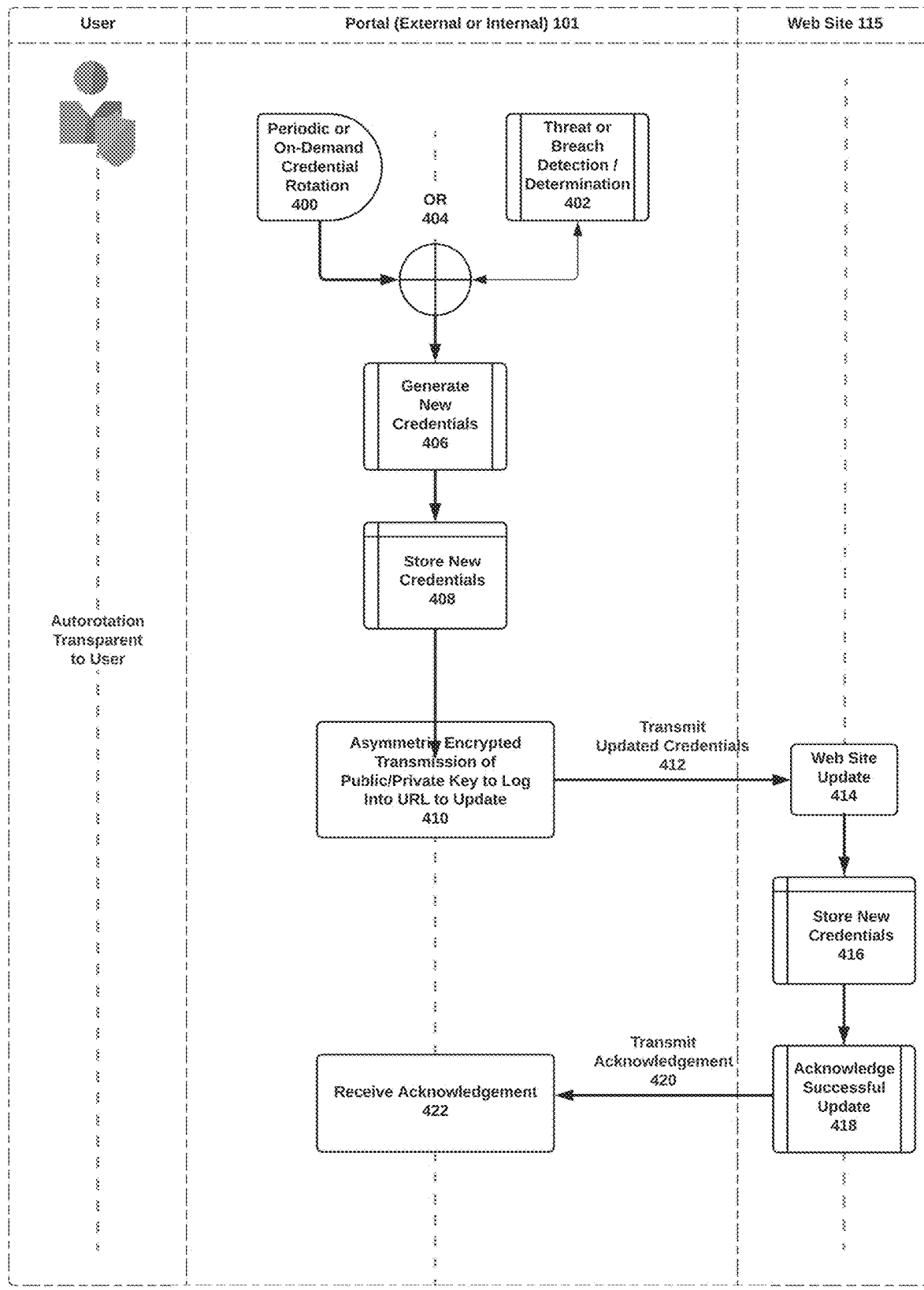
FIG. 4 - Transparent Autorotation of User Credentials

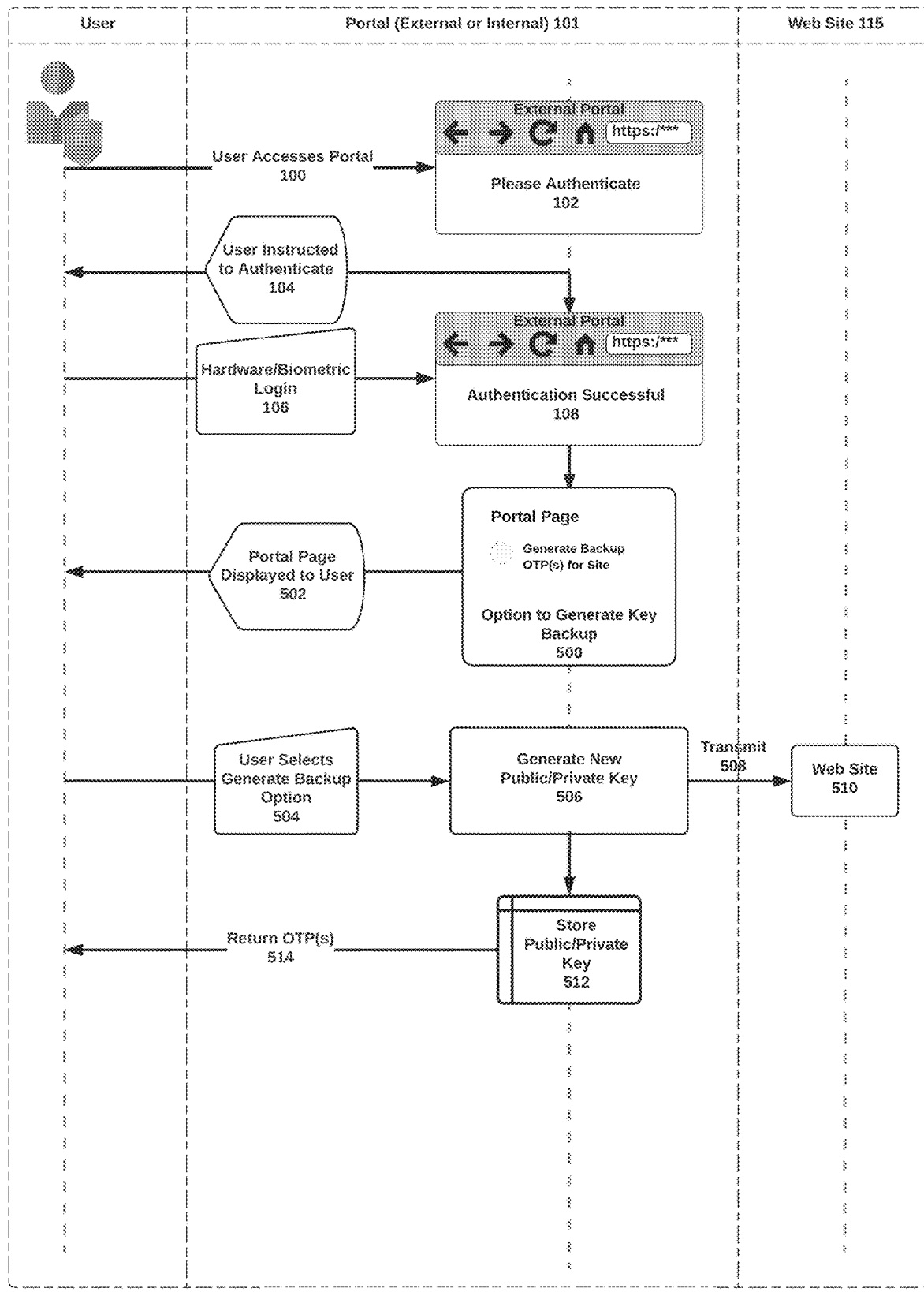
FIG. 5 - OTP Encryption Key Backup

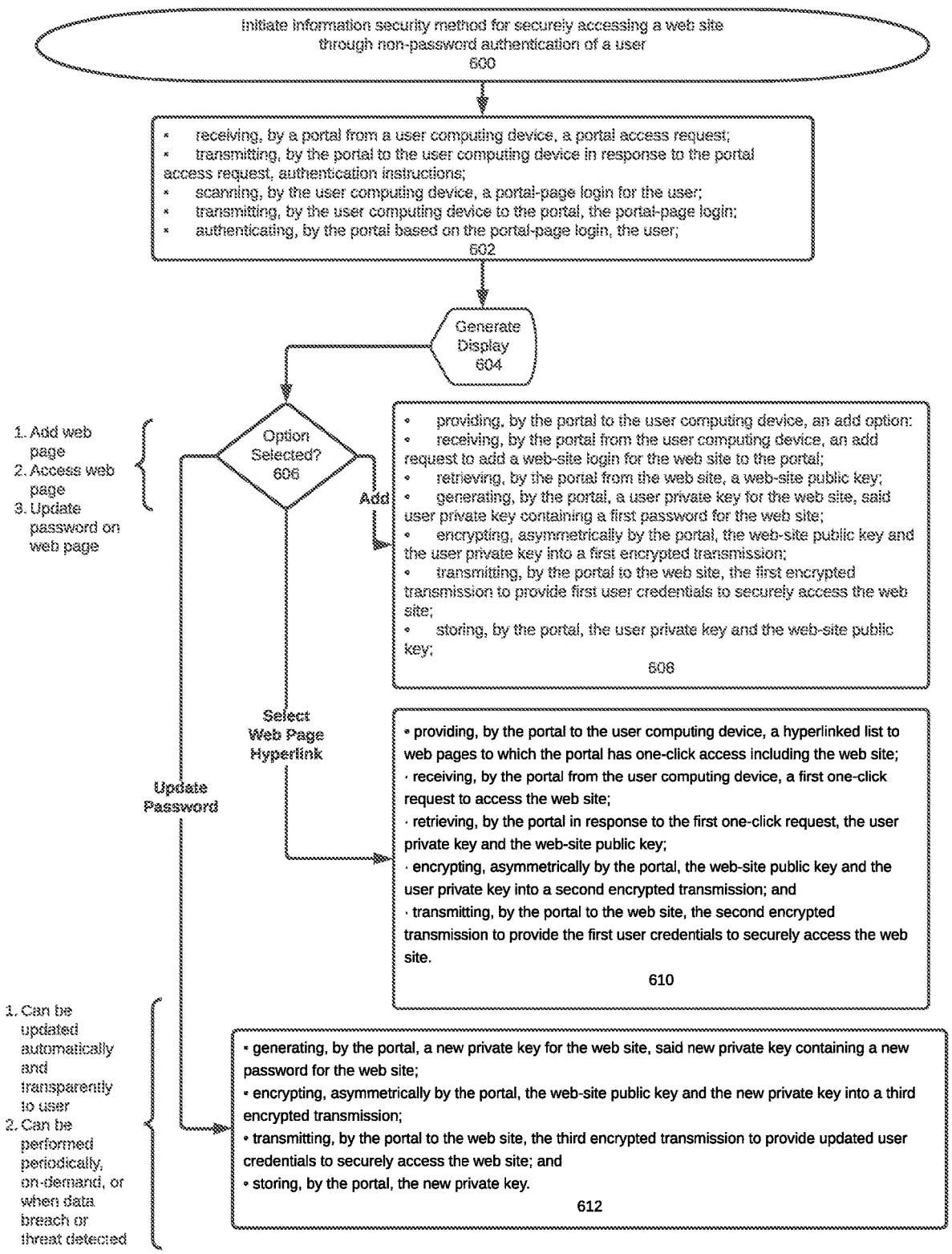
FIG. 6 - Sample Method

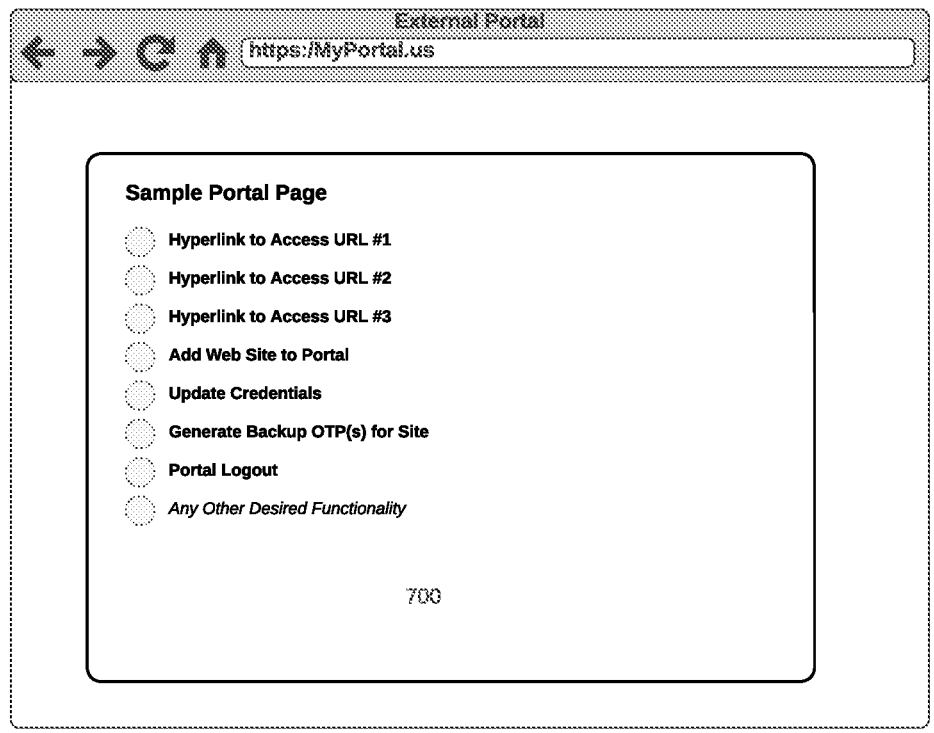
FIG. 7 - Sample Portal Screen

PORTAL CONTROL OF WEB SITE CREDENTIALS USING ASYMMETRIC PUBLIC/PRIVATE KEY ENCRYPTION WITHOUT USER SELECTION OR USER PASSWORD MANAGEMENT

TECHNICAL FIELD

The present disclosure relates to information security and, more particularly, to systems, methods, and apparatus for the prevention of unauthorized access to resources of a system or information system, including the manner of identifying and verifying the entity, process, or mechanism requesting access to the resource, by hardware/biometric login to portals, transparent handling, autorotation, and management of authentication credentials using asymmetric public/private key encryption to web sites.

DESCRIPTION OF THE RELATED ART

Many web sites only provide rudimentary security that authenticates users by utilizing traditional usernames and user-provided passwords. This primitive approach presents several problems.

When consumers create their own passwords, there is always a possibility that they will come up with credentials that are weak and vulnerable to cyber-attacks. Because consumers are more inclined to have something that's easy to remember, they may subconsciously skip password-security best practices. As a result, threat vectors can adjust their brute-force systems and crack open passwords in no time. This is accomplished by threat vectors using a method of trial and error to guess correct passwords. Usually, these attacks are automated using a list of frequently used usernames and passwords. Threat vectors can utilize dedicated tools to make vast numbers of login attempts at high speed.

As a result, strong passwords may be required. Criteria for selecting strong passwords can include requirements that do not allow users to utilize personal information like names of family members, pets, phone numbers, birthdays, or any data that is publicly available, and prohibit use of dictionary words, proper nouns, or letter and number combinations like abc123. Strong passwords may have length and type of character requirements (e.g., combinations of capital letters, lower case letters, numbers, punctuation, symbols, not previously used, etc.). Many websites often have restrictions and maximum limitations as to how many characters can be used and which characters can be included in a password. This reduces the security of the password since length is the most important aspect from a security perspective.

Other attempts to increase security include requiring a minimum length as to the number of characters that must be included in a password (e.g., at least 10 characters), forcing consumers to change passwords at least once every month or so, and preventing users from reusing prior passwords or for using the same password to access different sites or systems.

The foregoing makes it problematic and burdensome for users to select "strong" passwords, keep track of all of their unique passwords for myriad sites, make sure that their passwords are not reused or recycled on the same site over a period of time, make sure that the same password is not used simultaneously on different sites, update their passwords either periodically or when users become aware of potential data breaches, and constantly enter and re-enter user login and password information for every different site.

Some prior-art password-manager applications are commercially available such as LastPass and 1Password. By using these applications, users can log into an encrypted vault on their computer or phone using a primary password or authenticator. The applications allow users to select their usernames and choose their own passwords or use a built-in generator to generate random strong passwords for each site. Hyperlink(s) can be included to enable users to click on a URL and have the application auto-populate the username and password fields on a web site login page. The applications can monitor each entry in the vault to provide alerts if a password is reused for more than one site or if usernames, passwords, or personal data is discovered on the Dark Web. But users are still ultimately responsible for manually picking or approving a suggested password, entering algorithm criteria (e.g., number of characters used, types of characters that can be used, or implementing other password rules, etc.), determining whether a strong password is to be generated, keeping track of the sites for which they have login credentials, monitoring alerts for previously used passwords or the same passwords used for different sites, monitoring alerts for data breaches or Dark Web disclosures of security information, etc.

Additional security can be provided to augment use of traditional logins by usernames and passwords. One such example is dual-factor authentication in which a site will send a message to an authenticated device (e.g., a user's phone, table, computer, etc.) after the site receives a login attempt on a first device. The message can provide a PIN or the like that the user can then use to complete a login attempt to the site. A similar example is through the use of an authenticator application. After a login attempt, the user will be prompted to open their authenticator application, identify the authenticator number corresponding to the login site, and then manually enter the authenticator number into the web site to complete the login.

The foregoing is insufficient to provide adequate security, requires user education about best practices, requires enforcement mechanisms, relies on manual user interventions in the event of data breaches or Dark Web detections, is not transparent, and is time consuming and burdensome thereby reducing user productivity.

Hence there is a long felt and unsatisfied need to provide enhanced security and simplify user and credential authentication that does not rely on users to select, maintain, and enter their passwords for web sites or the like. There is also a need to be able to automatically and securely transmit credentials to web sites in an encrypted manner. User credentials need to be updated automatically whenever breaches or the like are detected. The credentials need to be autorotated as well at frequent intervals for additional security. User authentication should be transparent to the users without requiring user intervention whenever possible.

SUMMARY OF THE INVENTION

In accordance with one or more arrangements of the non-limiting sample disclosures contained herein, solutions are provided to address one or more of the shortcomings in the field of information security by, inter alia: (a) providing hardware/biometric login (or the like) for users to access an external portal (or the like); (b) adding web sites (or the like) to the portal to which users would like to have automated secure access; (c) displaying on the portal a hyperlinked list of the sites to which users have automated secure access via asymmetric encrypted transmissions; (d) generating public/private keys for the user to access the web sites; (e) storing the public/private keys for the portal and the public keys for the web sites; (f) automatically generating strong passwords for the user and embedding them in a portion of the private keys; (g) updating private keys and user credentials automatically and without user intervention when data breaches are discovered or when Dark Web data is detected; (h) autorotating passwords in private keys at frequent intervals (or as desired) automatically and without user intervention to provide optimum security and minimize the available period of time a threat vector would have to discover password and attempt to breach a web site; (i) updating login credentials at web sites automatically and without user intervention when login credentials stored in the portal have been updated or autorotated; and/or (j) utilizing one-time passwords (or the like) to generate a new public/private key for key backup. Thus, the portal contains a hyperlinked page that allows users to log into the web sites with a single click in accordance as referenced herein. And preferably some or all of the foregoing is implemented to be transparent to the user and to avoid necessitating user intervention or involvement.

Considering the foregoing, the following presents a simplified summary of the present disclosure to provide a basic understanding of various aspects of the disclosure. This summary is not limiting with respect to the exemplary aspects of the inventions described herein and is not an extensive overview of the disclosure. It is not intended to identify key or critical elements of or steps in the disclosure or to delineate the scope of the disclosure. Instead, as would be understood by a personal of ordinary skill in the art, the following summary merely presents some concepts of the disclosure in a simplified form as a prelude to the more detailed description provided below. Moreover, sufficient written descriptions of the inventions are disclosed in the specification throughout this application along with exemplary, non-exhaustive, and non-limiting manners and processes of making and using the inventions, in such full, clear, concise, and exact terms to enable skilled artisans to make and use the inventions without undue experimentation and sets forth the best mode contemplated for carrying out the inventions.

In some arrangements, an information security method for securely accessing a web site through non-password user authentication of a user can comprise the steps of: receiving, by a portal (external or internal) from a user computing device, a portal access request; transmitting, by the portal to the user computing device in response to the portal access request, authentication instructions; scanning, by the user computing device, a portal-page login for the user; transmitting, by the user computing device to the portal, the portal-page login; and authenticating, by the portal based on the portal-page login, the user. Dual factor or authenticator application confirmation for user authentication can also be utilized.

In some arrangements, the portal (external or internal) may also provide an add option, which performs the functions of: receiving, by the portal from the user computing device, an add request to add a web-site login for the web site to the portal; retrieving, by the portal from the web site, a web-site public key; generating, by the portal, a user private key for the web site, said user private key containing a first password for the web site; encrypting, asymmetrically by the portal, the web-site public key and the user private key into a first encrypted transmission; transmitting, by the portal to the web site, the first encrypted transmission to provide first user credentials to securely access the web site; and storing, by the portal, the user private key and the web-site public key.

In some arrangements, the portal (external or internal) may also provide an option to select a list of web sites that have already been entered by the user and for which one-click access is available. This functionality may include the steps of: providing, by the portal to the user computing device, a hyperlinked list to web pages to which the user has already set up and thus one-click access to the web site is available on the portal; receiving, by the portal from the user computing device, a first one-click request to access the web site; retrieving, by the portal in response to the first one-click request, the user private key and the web-site public key; encrypting, asymmetrically by the portal, the web-site public key and the user private key into a second encrypted transmission; and transmitting, by the portal to the web site, the second encrypted transmission to provide the first user credentials to securely access the web site.

In some arrangements, the non-password authentication of the user can be based on hardware devices (coupled to a user computing device) or biometrics of the user such as facial recognition, fingerprint scanning, or other biometric detection mechanisms. Supplemental authentication technology or steps may be utilized as well.

In some arrangements, the non-password authentication method can automatically, and transparently to the user, update the user credentials on the web site (e.g., on-demand, on a periodic basis, when a data breach has been identified, when Dark We information has been discovered, etc.) such as, for example, the user password for the web site. The method can include steps such as: generating, by the portal, a new private key for the web site, said new private key containing a new password for the web site; encrypting, asymmetrically by the portal, the web-site public key and the new private key into a third encrypted transmission; transmitting, by the portal to the web site, the third encrypted transmission to provide updated user credentials to securely access the web site; and storing, by the portal, the new private key.

In some arrangements, security notifications can be provided to the user or the user computing device if a data breach has been reported or Dark Web information has been discovered, and therefore auto-rotation of passwords can occur. Security notification can be provided or not, depending on user and/or site-administrator preferences. Auto-rotation of passwords may occur with or without notice to the user, again depending on user or site-administrator preference. Preferably, auto-rotation of passwords happens quickly and transparently to the user in order to provide the best possible security and minimize any user interruptions and/or interactions unless desired.

In some arrangements, the non-password authentication method can include a backup option, which can comprise steps such as: providing, by the portal to the user computing device, a backup option; receiving, by the portal from the user computing device, a backup request to add a one-time password (OTP) for the web site to the portal; retrieving, by the portal from the web site in response to the backup request, the web-site public key; generating, by the portal, an OTP private key for the web site, said OTP private key containing the OTP password for the web site; encrypting, asymmetrically by the portal, the web-site public key and the OTP private key into a fifth encrypted transmission; transmitting, by the portal to the web site, the fifth encrypted transmission to provide OTP user credentials to securely access the web site on a one-time basis; and storing, by the portal, the OTP private key and the web-site public key.

In some arrangements, machine learning or artificial intelligence may be utilized by the portal to automatically determine based on information contained on the web site or displayed on a web site login page (or the like) how to reset a password or recover a forgotten password. This information can then be utilized to allow the portal to update a password and private key used to access the web site. The machine learning can be supervised, semi-supervised, or unsupervised, or natural language processing or other artificial intelligence may be used. This could be accomplished, for example, by scanning the text on the web site to locate a hyperlink to reset a password, recover a password, forgotten password, update user credentials, etc.

In some arrangements, the non-password authentication method can perform the steps of: autorotating, by the portal (external or internal) on a periodic basis or when a security threat is identified, the first password into a new password transparently to the user; generating, by the portal, a new private key based on the new password; encrypting, asymmetrically by the portal, the web-site public key and the new private key into a third encrypted transmission; transmitting, by the portal to the web site, the third encrypted transmission to provide updated user credentials for the web site; and storing, by the portal, the web-site public key and the new private key.

In some arrangements, one or more various steps of processes disclosed herein can be implemented in whole or in part as computer-executable instructions stored on computer-readable media. Functionality and steps can be performed on a machine or distributed across a plurality of machines that are in communication with one another. Of course, a person of ordinary skill in the art will understand that any one or more of the foregoing or other implementations discussed herein may take various forms such as binary executables, scripts, macros, HTML, coding, etc. The disclosures contained herein are merely examples for illustration purposes and are in no way limiting.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of 'a', 'an', and 'the' include plural referents unless the context clearly dictates otherwise.

BRIEF DESCRIPTION OF DRAWINGS

FIG. 1 depicts a swim-lane, functional, flow diagram showing sample interactions, interfaces, steps, functions, and components for users, portals (external or internal), and web sites in accordance with one or more information-security aspects of this disclosure as they relate to setting up the portal/web site and/or adding new sites so that a user can authenticate to the portal without a password and add web sites to the portal to be managed such that the user can have 1-click access (including automated login) to the web sites without requiring the user to keep track of their passwords or manage their passwords.

FIG. 2 depicts a swim-lane, functional, flow diagram showing sample interactions, interfaces, steps, functions, and components for users, portals (external or internal), and web sites in accordance with one or more information-security aspects of this disclosure as they relate to enabling users to access configured web sites from the portal.

FIG. 3 depicts a swim-lane, functional, flow diagram showing exemplary asymmetric encryption of web site public keys and portal-generated private keys that can be transmitted to web sites and decoded by them in accordance with one or more information-security aspects of this disclosure.

FIG. 4 depicts a swim-lane, functional, flow diagram showing sample interactions, interfaces, steps, functions, and components for portals (external or internal) and web sites in accordance with one or more information-security aspects of this disclosure as they relate to autorotate or otherwise update user passwords for web sites in a transparent manner such that the user need not know the password used by the portal for access to the web site.

FIG. 5 depicts a swim-lane, functional, flow diagram showing sample interactions, interfaces, steps, functions, and components for users, portals (external or internal), and web sites in accordance with one or more information-security aspects of this disclosure as they relate to one-time passwords (OTP) or backup of private keys to single session access to the web site.

FIG. 6 depicts a sample information-security method for securely accessing a web site through non-password authentication of a user to a portal including the options to add web pages to the portal, access hyperlinked lists of configured web pages, update passwords for the web pages, etc. in accordance with one or more information-security aspects of this disclosure.

FIG. 7 depicts a sample portal page that provides a non-exclusive list of various functions or options that can be presented to the user after logging into the portal in accordance with one or more information-security aspects of this disclosure.

DETAILED DESCRIPTION

In the following description of the various embodiments to accomplish the foregoing, reference is made to the accompanying drawings, which form a part hereof, and in which is shown by way of illustration, various embodiments in which the disclosure may be practiced. It is to be understood that other embodiments may be utilized, and structural and functional modifications may be made. It is noted that various connections between elements are discussed in the following description. It is noted that these connections are general and, unless specified otherwise, may be direct or indirect, wired, or wireless, and that the specification is not intended to be limiting in this respect.

As used throughout this disclosure, any number of computers, machines, or the like can include one or more general-purpose, customized, configured, special-purpose, virtual, physical, and/or network-accessible devices such as: administrative computers, application servers, clients, cloud devices, clusters, compliance watchers, computing devices, computing platforms, controlled computers, controlling computers, desktop computers, distributed systems, enterprise computers, instances, laptop devices, monitors or monitoring systems, nodes, notebook computers, personal computers, portable electronic devices, portals (internal or external), servers, smart devices, streaming servers, tablets, web servers, and/or workstations, which may have one or more application specific integrated circuits (ASICs), microprocessors, cores, executors etc. for executing, accessing, controlling, implementing etc. various software, computer-executable instructions, data, modules, processes, routines, or the like as discussed below.

References to computers, machines, or the like as in the examples above are used interchangeably in this specification and are not considered limiting or exclusive to any type(s) of electrical device(s), or component(s), or the like. Instead, references in this disclosure to computers, machines, or the like are to be interpreted broadly as understood by skilled artisans. Further, as used in this specification, computers, machines, or the like also include all hardware and components typically contained therein such as, for example, ASICs, processors, executors, cores, etc., display(s) and/or input interfaces/devices, network interfaces, communication buses, or the like, and memories or the like, which can include various sectors, locations, structures, or other electrical elements or components, software, computer-executable instructions, data, modules, processes, routines etc. Other specific or general components, machines, or the like are not depicted in the interest of brevity and would be understood readily by a person of skill in the art.

As used throughout this disclosure, software, computer-executable instructions, data, modules, processes, routines, or the like can include one or more: active-learning, algorithms, alarms, alerts, applications, application program interfaces (APIs), artificial intelligence, approvals, asymmetric encryption (including public/private keys), attachments, big data, CRON functionality, daemons, databases, datasets, datastores, drivers, data structures, emails, extraction functionality, file systems or distributed file systems, firmware, governance rules, graphical user interfaces (GUI or UI), images, instructions, interactions, Java jar files, Java Virtual Machines (JVMs), juggler schedulers and supervisors, load balancers, load functionality, machine learning (supervised, semi-supervised, unsupervised, or natural language processing), middleware, modules, namespaces, objects, operating systems, platforms, processes, protocols, programs, rejections, routes, routines, security, scripts, tables, tools, transactions, transformation functionality, user actions, user interface codes, utilities, web application firewalls (WAFs), web servers, web sites, etc.

The foregoing software, computer-executable instructions, data, modules, processes, routines, or the like can be on tangible computer-readable memory (local, in network-attached storage, be directly and/or indirectly accessible by network, removable, remote, cloud-based, cloud-accessible, etc.), can be stored in volatile or non-volatile memory, and can operate autonomously, on-demand, on a schedule, spontaneously, proactively, and/or reactively, and can be stored together or distributed across computers, machines, or the like including memory and other components thereof. Some or all the foregoing may additionally and/or alternatively be stored similarly and/or in a distributed manner in the network accessible storage/distributed data/datastores/databases/big data etc.

As used throughout this disclosure, computer "networks," topologies, or the like can include one or more local area networks (LANs), wide area networks (WANs), the Internet, clouds, wired networks, wireless networks, digital subscriber line (DSL) networks, frame relay networks, asynchronous transfer mode (ATM) networks, virtual private networks (VPN), or any direct or indirect combinations of the same. They may also have separate interfaces for internal network communications, external network communications, and management communications. Virtual IP addresses (VIPs) may be coupled to each if desired. Networks also include associated equipment and components such as access points, adapters, buses, ethernet adaptors (physical and wireless), firewalls, hubs, modems, routers, and/or switches located inside the network, on its periphery, and/or elsewhere, and software, computer-executable instructions, data, modules, processes, routines, or the like executing on the foregoing. Network(s) may utilize any transport that supports HTTPS or any other type of suitable communication, transmission, and/or other packet-based protocol.

By way of non-limiting disclosure, FIG. 1 depicts a swim-lane, functional, flow diagram showing sample interactions, interfaces, steps, functions, and components for users, portals (external or internal), and web sites in accordance with one or more information-security aspects of this disclosure as they relate to setting up the portal/web site and/or adding new sites so that a user can authenticate to the portal without a password and add web sites to the portal to be managed.

A user accesses an internal or external portal from a user computing device in 100. The portal prompts the user to authenticate in 102, and an authentication display or instructions are displayed on the user computing device in 104.

The user logs into the portal, without using a password, by a hardware or biometric login in 106. The portal provides an authentication response message such as "authentication successful" or the like in 108. If desired, the authentication or login may also be further augmented by commercially available dual-factor authentication and/or use of commercially available authenticator applications.

An initial portal page is generated in 110 and displayed to the user in 112. It can include an option or prompt for the user to setup or add the web sites to which the user wants 1-click access managed by the portal.

The user can select add a web site and provide initial web site login info in 114. The portal retrieves a public key in 118 from the web site 115. The portal generates a private key with the initial password embedded therein or with a new strong password generated by the portal to be used with the web site in 116. The public and private keys for the web site are stored by the portal in 120.

Login information (e.g., username and password info) is communicated by the portal to the web site by an asymmetric encrypted transmission in 112. After successful communication with to the web site, the portal connection to the web site is established and 1-click access to the web site is available to the user after logging into or accessing the portal. Accordingly, the portal can automatically handle the passwords for all web sites and the user need not be aware of or manage all their own passwords.

An updated portal page providing a hyperlinked list of web sites for which portal access has been set up can then be generated in 124 and displayed to the user on the user's computing device in 126. The portal page may also continue to show an option to add a new web site or the like such that additional web sites for 1-click access and password management can be added to the portal like shown in 124. Upon completion, the portal waits for the next command or user action in 128.

By way of non-limiting disclosure, FIG. 2 shows a swim-lane, functional, flow diagram with sample interactions, interfaces, steps, functions, and components for users, portals (external or internal), and web sites in accordance with one or more information-security aspects of this disclosure as they relate to enabling users to access configured web sites from the portal.

After user authentication to the portal as in 108, a portal page can be generated that provides a hyperlinked list of web sites set up for portal 1-click access and user credential management and control. For example, the portal may have an option to access any given number of web sites (or URLs) as shown in 200. The portal page is then displayed to the user at 201 on the user's computing device.

When the user selects in 202 one of the web sites or URLs listed in 200, the user's private key for the URL and the public key for the web site can be retrieved by the portal from memory and asymmetrically encrypted in 203. The encrypted transmission is then transmitted in 204 to log into the web site when presented with a web site login prompt in 206.

After a successful login, the web site will generate a SessionID in 208 and this will be provided back to the user computing device in 210. The SessionID will be used by the user computing device to communicate with the web site in 212 and will thereafter allow user access to the web site in 214.

By way of non-limiting disclosure, FIG. 3 depicts a swim-lane, functional, flow diagram showing exemplary asymmetric encryption of web site public keys and portal-generated private keys that can be transmitted to web sites and decoded by them in accordance with one or more information-security aspects of this disclosure.

The portal may contain a local or accessible database 300 or similar storage for housing portal data such as user info, web site info, user private keys 302, user public keys 304, etc. Web site public keys 306 may also be stored in the database (not shown) or may be retrieved on-demand as needed by the portal.

The portal will asymmetrically encrypt the user's credentials for the web site by using the user's private key and the web site's public key in 308. The encrypted transmission is sent in 310 and received by the web site in 312. The web site then decodes or decrypts the transmission in 316 by using the web site's private key 314. A web site database or the like 316 can store user credentials for web site access in 318.

By way of non-limiting disclosure, FIG. 4 depicts a swim-lane, functional, flow diagram showing sample interactions, interfaces, steps, functions, and components for portals (external or internal) and web sites in accordance with one or more information-security aspects of this disclosure as they relate to autorotate or otherwise update user passwords for web sites in a transparent manner such that the user need not know the password used by the portal for access to the web site.

Benefits of one or more aspects of this disclosure include the secure and constant update and management of passwords and credentials by the portal so that the user does not have to keep track of passwords, or even know what the passwords are. Further, the portal can update, passwords automatically, on demand, periodically, when data breaches become known, and/or when dark web information is detected.

For example, the portal can wait until it is time to change credentials or passwords as in 400. When the time for the change or an on-demand request is made, the portal can proceed with the process to autorotate (or change) the password in 400. In parallel or alternatively, when a threat or breach is detected or communicated to the portal, the portal can decide to proceed with the autorotation as in 402. Either condition can trigger the update or autorotation of credentials as in 404.

When autorotation is triggered or otherwise deemed appropriate by the portal, new credentials (e.g., a new password or the like) are generated for the user for the web site in question in 406. The new credentials are stored by the portal in 408. The portal asymmetrically encrypts the updated information in a public/private key transmission to the web site to update login credentials for the user for that site in 410. The encrypted message containing the updated credentials is transmitted in 412 to the web site for it to update its records regarding the credentials. The updated credentials are stored by the web site in 416 and a successful acknowledge message can be generated to instruct the portal that the credentials were successfully updated. The acknowledgement is then transmitted in 420 to the portal where it is received in 422.

As illustrated in FIG. 4, the foregoing activity (and the like) can be performed without user knowledge or intervention if desired.

By way of non-limiting disclosure, FIG. 5 depicts a swim-lane, functional, flow diagram showing sample interactions, interfaces, steps, functions, and components for users, portals (external or internal), and web sites in accordance with one or more information-security aspects of this disclosure as they relate to one-time passwords (OTP) or backup of private keys to single session access to the web site.

As noted previously, steps of user access to the portal, authentication of the user by the portal, use of a hardware or biometric login (or the like) to the portal, and successful authentication and related messages and displays, are repeated in FIG. 5 as well as illustrated in prior figures as elements/steps 100, 102, 104, 106, and 108.

The portal page displayed as a landing page after successful no-password authentication by the user portal can also including an option to generate a key backup such as creating backup one-time passwords (OTPs) or the like for one or more of the web sites that are managed by the portal as in 500/502.

A user can select from the portal page the option to generate a backup in 504. In response, the portal can generate new public/private key(s) for the web site in 506. These can be transmitted in 508 to the web site that updates its records accordingly in 510. The portal can store the public/private key for the backup in 512 and return the OTP(s) in 514 to the user to be kept as backup information.

By way of non-limiting disclosure, FIG. 6 depicts a sample information-security method for securely accessing a web site through non-password authentication of a user to a portal including the options to add web pages to the portal, access hyperlinked lists of configured web pages, update passwords for the web pages, etc. in accordance with one or more information-security aspects of this disclosure.

An information security method for securely accessing a web site through non-password authentication of a user can be initiated in 600.

As in 602, after commencement, a portal access request can be received by a portal from a user computing device. In response to the portal access request, authentication instructions can be transmitted by the portal to the user computing device. The user computing device can scan or otherwise acquire hardware, biometric or other login information for the user or the user computing device, as part of a portal-page login for the user to access the portal. The user computing device can transmit to the portal, the portal-page login. The portal can authenticate the user based on the portal-page login. In response, the portal can generate display(s) or screen(s) with various options to add web sites, remove web sites, access web sites, generate OTPs, update passwords or credentials for web pages, etc. as in 604.

The portal can then wait for an option to be selected by the user as in 606.

If the user selects an "add" option, the portal can perform one or more steps or execute functions in 608 such as: receiving, by the portal from the user computing device, an add request to add a web-site login for the web site to the portal; retrieving, by the portal from the web site, a web-site public key; generating, by the portal, a user private key for the web site, said user private key containing a first password for the web site; encrypting, asymmetrically by the portal, the web-site public key and the user private key into a first encrypted transmission; transmitting, by the portal to the web site, the first encrypted transmission to provide first user credentials to securely access the web site; and storing, by the portal, the user private key and the web-site public key.

If the user selects a web page to access, the portal can perform one or more steps or execute functions in 610 such as: receiving, by the portal from the user computing device, a first one-click request to access the web site; retrieving, by the portal in response to the first one-click request, the user private key and the web-site public key; encrypting, asymmetrically by the portal, the web-site public key and the user private key into a second encrypted transmission; and transmitting, by the portal to the web site, the second encrypted transmission to provide the first user credentials to securely access the web site.

If the user selects an update password option, the portal can perform one or more steps or execute functions in 610 such as: generating, by the portal, a new private key for the web site, said new private key containing a new password for the web site; encrypting, asymmetrically by the portal, the web-site public key and the new private key into a third encrypted transmission; transmitting, by the portal to the web site, the third encrypted transmission to provide updated user credentials to securely access the web site; and storing, by the portal, the new private key.

Last, by way of non-limiting disclosure, FIG. 7 depicts a sample portal page that provides a non-exclusive list of various functions or options that can be presented to the user after logging into the portal in accordance with one or more information-security aspects of this disclosure. As illustrated in 700, these may include: 1-click selection of hyperlinks to access URLs already set up as well as options to add web sites, update user credentials for the portal or web sites, generation of OTP or the like backups, portal logout, and any other desired functionality.

Similar functionality and steps will be understood by skilled artisans to be performed for any other request made by the user of the portal or any other task the portal is triggered to perform. Such additional functionality can include scanning web sites for hyperlinked options to recover passwords, change passwords etc. Further functionality and steps can be easily used to adapt the present disclosure to log into applications local on a user computing device and/or to login to VPN clients or the like.

Beneficially, the portal of the disclosure can update automatically and transparently to user passwords or credentials, and can be performed periodically, on-demand, or when data breach or threat detected.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

The invention claimed is:

1. A method for securely accessing a web site through non-password authentication of a user, the method comprising:

receiving, by a portal executing on a server, a portal access request from a user computing device, wherein the portal access request initiates a user session with the portal;

transmitting, by the portal executing on the server, authentication instructions to the user computing device in response to the portal access request, wherein the authentication instructions prompt the user computing device to acquire non-password authentication data;

scanning, by the user computing device, a portal-page login for the user, wherein the portal-page login includes biometric data of the user acquired from a biometric sensor coupled to the user computing device, the biometric data being distinct from a user-entered password;

transmitting, by the user computing device, the portal-page login including the biometric data to the portal executing on the server;

authenticating, by the portal executing on the server, the user based on the portal-page login including the biometric data, thereby granting the user access to the portal without requiring the user to enter a password;

providing, by the portal executing on the server, an add option to the user computing device via an initial portal page displayed on the user computing device, wherein the add option enables the user to request addition of a web site for automated credential management by the portal;

receiving, by the portal executing on the server, an add request from the user computing device to add the web site to the portal, wherein the add request includes initial login information for the web site provided by the user;

retrieving, by the portal executing on the server, a web-site public key from the web site, wherein the web-site public key is generated by the web site and obtained directly from the web site by the portal;

generating, by the portal executing on the server, a user private key for the web site, wherein the user private key embeds a first password automatically generated by the portal for the web site, the first password being a strong password created without user selection or user approval;

encrypting, by the portal executing on the server, the user private key including the embedded first password with the web-site public key into a first encrypted transmission using asymmetric encryption, wherein the first encrypted transmission encapsulates the initial login information as updated by the first password;

transmitting, by the portal executing on the server, the first encrypted transmission to the web site, wherein the web site decrypts the first encrypted transmission using a web-site private key to store the initial login information updated with the first password as user credentials for the user;

storing, by the portal executing on the server, the user private key and the web-site public key in a database accessible to the portal, wherein the user private key and the web-site public key are associated with the web site for subsequent access;

generating, by the portal executing on the server, an updated portal page including a hyperlinked list of web sites managed by the portal, wherein the hyperlinked list includes a hyperlink to the web site configured for one-click access by the user;

displaying, by the user computing device, the updated portal page including the hyperlinked list received from the portal;

receiving, by the portal executing on the server, a one-click request from the user computing device to access the web site, wherein the one-click request is initiated by the user selecting the hyperlink to the web site from the hyperlinked list;

retrieving, by the portal executing on the server, the user private key and the web-site public key associated with the web site from the database in response to the one-click request;

encrypting, by the portal executing on the server, the user private key including the embedded first password with the web-site public key into a second encrypted transmission using asymmetric encryption, wherein the second encrypted transmission provides the user credentials to the web site;

transmitting, by the portal executing on the server, the second encrypted transmission to the web site, wherein the web site decrypts the second encrypted transmission using the web-site private key to authenticate the user and enable access to the web site without requiring the user to enter login credentials;

detecting, by the portal executing on the server, a security condition necessitating a password update for the web site, wherein the security condition includes a data breach notification received by the portal from an external source or a detection of user data on an unauthorized platform monitored by the portal;

generating, by the portal executing on the server, a new user private key for the web site in response to the detected security condition, wherein the new user private key embeds a new password automatically generated by the portal without user intervention, the new password replacing the first password;

encrypting, by the portal executing on the server, the new user private key including the embedded new password with the web-site public key into a third encrypted transmission using asymmetric encryption;

transmitting, by the portal executing on the server, the third encrypted transmission to the web site, wherein the web site decrypts the third encrypted transmission using the web-site private key to update the user credentials with the new password;

storing, by the portal executing on the server, the new user private key in the database, wherein the new user private key replaces the user private key for subsequent access to the web site;

utilizing, by the portal executing on the server, machine learning to analyze text on a login page of the web site, wherein the machine learning identifies a hyperlink on the login page for resetting the first password and determines a reset procedure specific to the web site;

storing, by the portal executing on the server, the reset procedure determined by the machine learning in the database, wherein the reset procedure is associated with the web site for automated password updates; and performing, by the portal executing on the server, an automated password update on the web site using the reset procedure stored in the database, wherein the automated password update replaces the new password with a subsequent password embedded in a subsequent user private key without requiring user intervention, and wherein the portal encrypts and transmits the subsequent user private key to the web site using the web-site public key;

providing, by the portal executing on the server, a backup option to the user computing device via the updated portal page, wherein the backup option enables the user to request generation of a one-time password (OTP) for the web site;

receiving, by the portal executing on the server, a backup request from the user computing device to generate the OTP for the web site;

generating, by the portal executing on the server, an OTP private key for the web site, wherein the OTP private key embeds the OTP automatically generated by the portal without user selection;

encrypting, by the portal executing on the server, the OTP private key with the web-site public key into a fourth encrypted transmission using asymmetric encryption;

transmitting, by the portal executing on the server, the fourth encrypted transmission to the web site, wherein the web site decrypts the fourth encrypted transmission using the web-site private key to enable one-time access for the user;

storing, by the portal executing on the server, the OTP private key in the database; and returning, by the portal executing on the server, the OTP to the user computing device for use as backup information.

2. The method of claim 1, further comprising:

autorotating, by the portal executing on the server, the first password into an additional new password on a periodic basis defined by a predetermined interval, wherein the autorotation occurs transparently to the user without requiring user intervention;

generating, by the portal executing on the server, an additional new user private key embedding the additional new password;

encrypting, by the portal executing on the server, the additional new user private key with the web-site public key into an additional encrypted transmission using asymmetric encryption;

transmitting, by the portal executing on the server, the additional encrypted transmission to the web site to update the user credentials with the additional new password; and storing, by the portal executing on the server, the additional new user private key in the database.

3. The method of claim 2, wherein: the biometric data includes facial recognition data acquired by the biometric sensor coupled to the user computing device, and the scanning by the user computing device includes capturing the facial recognition data from the user.

4. The method of claim 3, further comprising:

generating, by the portal executing on the server, a security notification in response to the detected security condition, wherein the security notification indicates the data breach notification or the detection of user data on the unauthorized platform; and transmitting, by the portal executing on the server, the security notification to the user computing device for display to the user.

5. The method of claim 4, wherein: the hyperlinked list on the updated portal page displayed by the user computing device includes a plurality of hyperlinks to a plurality of web sites managed by the portal, and each hyperlink of the plurality of hyperlinks is associated with a respective user private key embedding a respective password automatically generated by the portal.

6. The method of claim 5, wherein: the reset procedure determined by the machine learning and stored by the portal includes a sequence of steps specific to the web site for navigating the login page to reset the first password, the sequence of steps being derived from the text on the login page analyzed by the machine learning.

7. The method of claim 6, further comprising:
receiving, by the web site, the second encrypted transmission from the portal;
decrypting, by the web site, the second encrypted transmission using the web-site private key to extract the user private key including the embedded first password;
generating, by the web site, a session identifier (SessionID) for the user in response to authenticating the user with the extracted first password;
transmitting, by the web site, the SessionID to the user computing device; and
utilizing, by the user computing device, the SessionID to communicate with the web site and access content on the web site.

8. The method of claim 7, wherein: all communications between the portal executing on the server, the user computing device, and the web site, including the first encrypted transmission, the second encrypted transmission, the third encrypted transmission, the fourth encrypted transmission, and the additional encrypted transmission, are secured using end-to-end encryption.

* * * * *